Patented Nov. 14, 1933

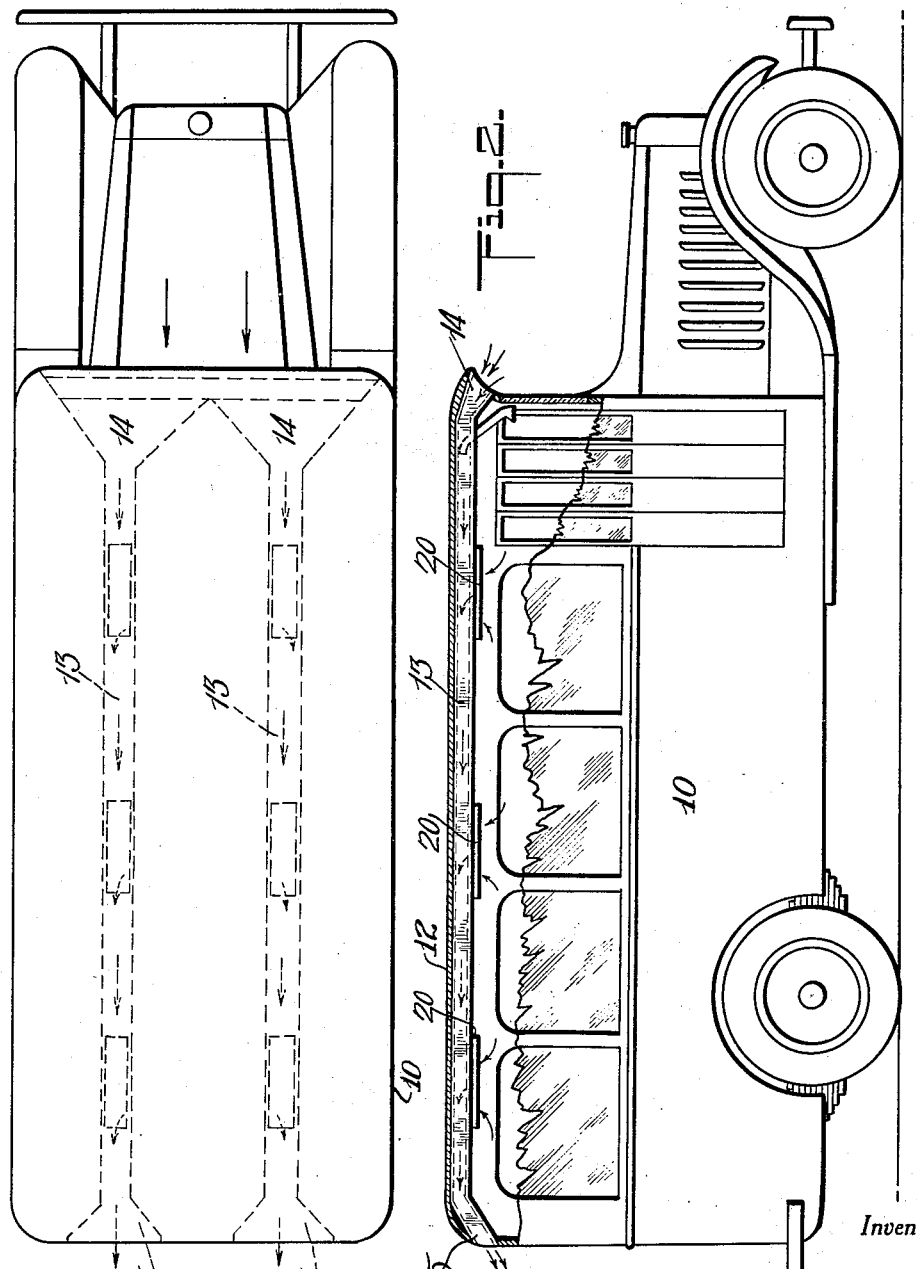

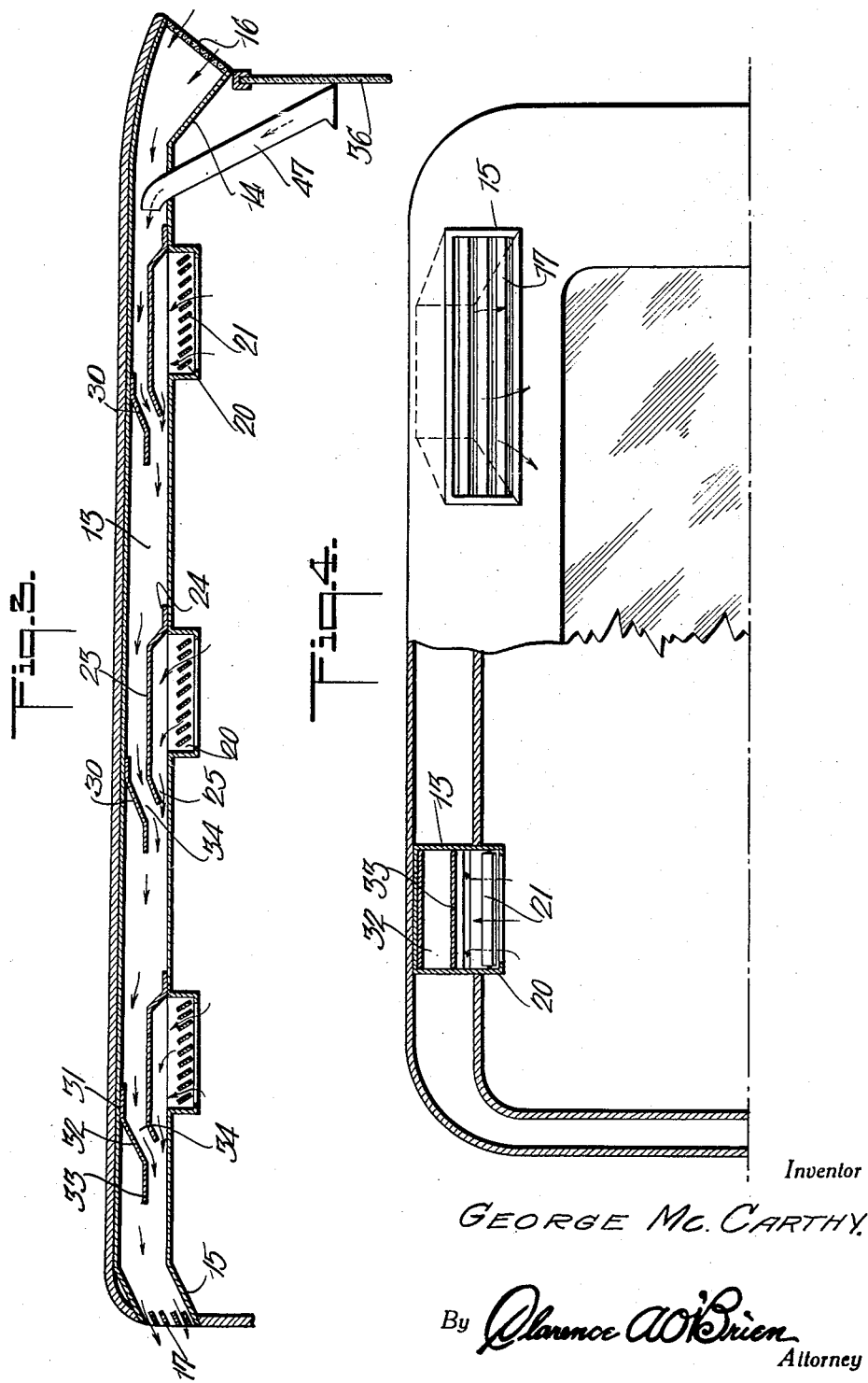

1,935,456

UNITED STATES PATENT OFFICE 1,935,456

VENTILATING SYSTEM

George McCarthy, Jersey City, N. J.

Application May 31, 1930, Serial No. 458,458
Renewed October 10, 1933

1 Claim. (Cl. 98—2)

This invention relates to ventilating systems, and more particularly it pertains to improvements in ventilating systems for closed vehicles, such as passenger and commercial vehicles and buildings.

It is an object of the invention to provide a novel ventilating system for closed compartments in which the foul or vitiated air will be drawn from the interior of the vehicle, and will be replaced by fresh air from the exterior thereof.

A further object of the invention resides in a novel construction whereby a free circulation of fresh air may be maintained upon the interior of a passenger vehicle without subjecting the passengers to harmful drafts of air within the passenger compartment thereof.

A further object of the invention resides in the provision of means which will be operated by the movement of the vehicle, and which at the same time will be weather-proof to exclude rain and the like from the interior of the passenger compartment of the vehicle.

With the above and other objects in view, reference is had to the accompanying drawings, wherein;

Figure 1 is a top plan view of a motor bus illustrating the invention in dotted lines, Figure 2 is a view in side elevation partly in section of a motor bus illustrating the manner in which the ventilating system is installed therein, Figure 3 is a detail longitudinal sectional view of the roof of a motor vehicle taken longitudinally through one of the elements of the ventilating system, and;

Figure 4 is a view partly in section and partly in rear elevation, the section being taken in a transverse plane.

In the drawings, 10 designates a passenger vehicle and 12 designates the roof thereof.

In carrying out the present invention, means in the form of air conduits 13 are carried by the roof of the vehicle body, preferably upon the interior thereof, and these conduits have downwardly projected front and rear ends 14 and 15 respectively each of whi h is flared as indicated in Figure 1. The ends may be covered with dust excluding means such as indicated at 16 in Figure 3, but the rear end is preferably closed by slots or the like 17 as indicated in Figure 3.

While in the present instance, two air conduits 13 have been shown, it is to be understood that in certain installations one may be sufficient, and on the other hand, in certain other installations even more than two may be required. Regardless of the number of air conduits employed, however the flared front end or edge of the conduits will be flared sufficiently to extend substantially throughout the entire width of the vehicle body as illustrated in Figure 1.

As illustrated at 20 in Figure 3, the air conduits have communication with the interior of the passenger compartment of the vehicle at spaced points throughout the length of the air conduits, by means of ducts or the like, and the open end of said ducts may if desired be covered with slats or the like 21 which permits of the entrance of air into the ducts from whence it passes to the air conduits.

Mounted within the air conduits 13 and overlying each of the intake ducts thereof; there is a guard or similar plate 23. These plates are each secured at their forward end to the bottom wall of the air conduits, while the rear end of each of the guard plates is slightly spaced from the bottom wall of the air conduits to form a contracted passage 25 by way of which the air passes from the inlet duct 20 to the air conduit 13. Adjacent the rear end of each of the guard plates 23, there is a deflector plate 30 secured to the top wall of the air conduit as at 31. These deflector plates extend downwardly as at 32 and rearwardly as at 33 to form a plurality of constricted portions or passages 34 into which the passages 25 heretofore mentioned, lead.

Extending from a point closely adjacent one of the windows, such as the front window 36 of the vehicle, upwardly into the conduits 13, there are air ducts 47, and the discharge ends of these ducts are disposed in a rearward direction as illustrated.

From the foregoing, it will be apparent that as the vehicle moves, air enters the flared forward ends of the conduits 13 and passes therethrough, discharging through the rear ends thereof. In its passage through the conduits 13, the air draws the foul or vitiated air from the passenger compartment through the ducts 20, and the contracted passage ways 34 and 25 materially aid in producing this result. The air ducts 47 being positioned adjacent the window 36, maintain a free circulation of air against the window, and prevent condensation of moisture thereon which is particularly desirable in vehicles of this type, since it maintains the window clear for clear vision by the operator thereof.

Having thus described the invention, what I claim as new and desire to secure by U. S. Letters Patent, is:

A ventilating device for passenger vehicles comprising in combination with the ceiling of the vehicle and a ventilating opening therein, a guard plate secured to said ceiling forward of said opening and arched thereover and extending rearwardly therebeyond, an angular downwardly extending flange projecting from the rear end of the guard plate and spaced from said ceiling, a cover spaced from said ceiling and said guard plate, and an angular deflector plate secured to and projecting downwardly from said cover, a rearwardly extending flange formed on said plate and disposed beyond said first mentioned downwardly extending flange, said deflector plate coacting with the downwardly extending flange of the guard plate to form a restricted air passage between the ceiling and the cover plate rearward of the opening in said ceiling.

GEORGE McCARTHY.